United States Patent
Wang et al.

(10) Patent No.: US 10,609,681 B2
(45) Date of Patent: Mar. 31, 2020

(54) USER DEVICE-INITIATED REQUEST FOR RESOURCE CONFIGURATION

(71) Applicant: Google LLC, Mountain View, CA (US)

(72) Inventors: Jibing Wang, Saratoga, CA (US); Erik Richard Stauffer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/961,672

(22) Filed: Apr. 24, 2018

(65) Prior Publication Data
US 2019/0327716 A1    Oct. 24, 2019

(51) Int. Cl.
| | |
|---|---|
| H04W 72/02 | (2009.01) |
| H04W 72/04 | (2009.01) |
| H04B 17/382 | (2015.01) |
| H04B 17/345 | (2015.01) |
| H04B 17/364 | (2015.01) |
| H04W 72/08 | (2009.01) |

(52) U.S. Cl.
CPC .......... H04W 72/02 (2013.01); H04B 17/345 (2015.01); H04B 17/364 (2015.01); H04B 17/382 (2015.01); H04W 72/0413 (2013.01); H04W 72/085 (2013.01)

(58) Field of Classification Search
CPC .. H04B 17/345; H04B 17/364; H04B 17/382; H04W 72/02; H04W 72/0413; H04W 72/085
See application file for complete search history.

(56) References Cited

U.S. PATENT DOCUMENTS

| | | | |
|---|---|---|---|
| 2016/0352551 A1* | 12/2016 | Zhang | H04L 27/2602 |
| 2017/0164350 A1* | 6/2017 | Sun | H04L 5/0007 |
| 2017/0188352 A1 | 6/2017 | Lee et al. | |
| 2017/0290013 A1* | 10/2017 | McCoy | H04L 5/005 |

(Continued)

FOREIGN PATENT DOCUMENTS

| | | |
|---|---|---|
| WO | 2018030710 | 2/2018 |
| WO | 2019209390 | 10/2019 |

OTHER PUBLICATIONS

IQ.IP.com search, May 28, 2019 (Year: 2019).*

(Continued)

*Primary Examiner* — Benjamin H Elliott, IV
(74) *Attorney, Agent, or Firm* — Colby Nipper PLLC

(57) ABSTRACT

The present disclosure describes techniques and systems for user device-initiated requests for resource configuration. In some aspects, a user device can detect one or more conditions related to communicating with a base station over a wireless connection. The user device selects, based on the conditions, elements of a resource configuration for communicating with the base station. The user device then transmits a request indicating the selected elements of the resource configuration to the base station, which can then allocate resources to the user device based on the request. The elements of the resource configuration selected by the user device may include one or more of numerology configuration, mini-slot configuration, or a schedule for uplink and downlink OFDM symbols within a resource of the wireless network. This may allow the user device to influence a resource configuration that is better-suited for communication over one or more channels of the wireless connection.

20 Claims, 10 Drawing Sheets

(56) References Cited

U.S. PATENT DOCUMENTS

| | | | |
|---|---|---|---|
| 2017/0311326 A1* | 10/2017 | Wong | H04W 72/0453 |
| 2017/0331577 A1* | 11/2017 | Parkvall | H04J 11/0079 |
| 2018/0049047 A1* | 2/2018 | Lin | H04W 24/02 |
| 2018/0083817 A1* | 3/2018 | Salem | H04L 5/0005 |
| 2018/0206246 A1* | 7/2018 | Zhang | H04W 74/006 |
| 2018/0278386 A1* | 9/2018 | Shim | H04L 5/0012 |
| 2018/0288746 A1* | 10/2018 | Zhang | H04L 1/0031 |
| 2018/0324786 A1* | 11/2018 | Hooli | H04W 72/0413 |
| 2018/0343153 A1* | 11/2018 | Zhang | H04L 27/2602 |
| 2019/0081842 A1* | 3/2019 | Kim | H04L 27/2657 |
| 2019/0260533 A1* | 8/2019 | Manolakos | H04W 8/22 |
| 2019/0297489 A1* | 9/2019 | Lei | H04J 13/0059 |
| 2019/0327716 A1* | 10/2019 | Wang | H04B 17/345 |

OTHER PUBLICATIONS

"Enhancements to SR in NR", 3GPP TSG-RAN WG2 Meeting #98, Hangzhou, China, May 15-19, 2017, May 2017, 4 pages.

"Granularity of SR Configurations", 3GPP TSG-RAN WG2 Meeting NR ad-hoc 2 R2-1706519 Qingdao, China, Jun. 27-29, 2017, Jun. 2017, 3 pages.

"Invitation to Pay Additional Fees", PCT Application No. PCT/US2019/014327, Mar. 19, 2019, 12 pages.

"Remaining Issues on LCP with Multiple Numerologies", 3GPP TSG-RAN WG2 #98; R2-1705624; Hangzhou, China, May 15-19, 2017, May 2017, 3 pages.

"Scheduling Request Design in NR System", 3GPP TSG RAN WG1 Meeting #90 R1-1713951; Prague, Czechia, Aug. 21-25, 2017, Aug. 2017, 3 pages.

"International Search Report and Written Opinion", PCT Application No. PCT/US2019/014327, dated Jun. 14, 2019, 25 pages.

"Invitation to Pay Additional Fees", PCT Application No. PCT/US2019/014327, dated Dec. 19, 2019, 3 pages.

* cited by examiner

800

```
┌─────────────────────────────────────────────┐
│  Determine conditions related to communicating │
│   with a base station over a wireless connection │
│                     802                       │
└─────────────────────────────────────────────┘
                      │
                      ▼
┌─────────────────────────────────────────────┐
│     Select a numerology configuration for      │
│     communicating with the base station       │
│                     804                       │
└─────────────────────────────────────────────┘
                      │
                      ▼
┌─────────────────────────────────────────────┐
│ Transmit, to the base station, a request to communicate with │
│ the base station based on the selected numerology configuration │
│                     806                       │
└─────────────────────────────────────────────┘
                      ┊
                      ▼
┌─────────────────────────────────────────────┐
│  Receive, from the base station, a resource grant │
│  allocating resources based on the selected numerology │
│                     808                       │
└─────────────────────────────────────────────┘
                      ┊
                      ▼
┌─────────────────────────────────────────────┐
│ Communicate, with the base station, via the allocated resources │
│                     810                       │
└─────────────────────────────────────────────┘
```

FIG. 8

USER DEVICE-INITIATED REQUEST FOR RESOURCE CONFIGURATION

BACKGROUND

Generally, a provider of a wireless network manages wireless communications over the wireless network. For example, a base station manages wireless communications with a user device associated with the wireless network. The provider of the wireless network receives a request to communicate, determines a resource configuration for the communication, and transmits a communication schedule to a user device that transmitted the request. The user device then follows the communication schedule to transmit to, and receive data from, the provider based on the resource configuration. However, the provider may be unable to detect conditions at the user device that may influence a quality of the communication or a user experience at the user device.

SUMMARY

This document describes techniques for, and systems that enable, user device-initiated requests for resource configuration. Advances in wireless communication technology allow a provider, such as a base station of a wireless network, to select resource configurations when allocating resources to associated user devices. However, the provider may be unable to detect conditions that would make a resource configuration preferable over another resource configuration. These conditions may include one or more of a Doppler effect, phase noise, a delay spread, other wireless connections of the user device, an amount or type of data to be communicated over the wireless connection, a power status of the user device, or a thermal status of the user device.

In contrast to provider-selected resource allocations, aspects of user device-initiated requests for resource allocation enable allocation of network resources (resources) based on conditions detected by a user device. For example, a user device can detect one or more of the afore-mentioned conditions and select, based on the conditions detected by the user device, elements of a resource configuration for communicating with a base station of a wireless network. The user device then transmits a request that indicates the selected resource configuration to the base station, which can then allocate resources to the user device based on the request. In some cases, the elements of the resource configuration selected by the user device include one or more of numerology configuration, mini-slot configuration, or a schedule for uplink and downlink orthogonal frequency-division multiplexing (OFDM) symbols within a resource of the wireless connection. This can improve an experience at the user device by allowing the user device to influence a resource configuration that is better-suited for communication over one or more channels of the wireless connection with the base station.

In some aspects, a user device determines conditions related to communicating with a base station over a wireless connection. The user device selects, based on the determined conditions, a numerology configuration of resource of the wireless connection for communicating with the base station. The user device then transmits, to the base station, a request to communicate with the base station, with the request identifying the selected numerology configuration of the resources of the wireless connection. In some implementations, the user device may receive, in response to transmitting the request, a resource grant allocating resources for communicating over the wireless connection based on the selected numerology configuration.

In other aspects, a user device includes a processor, a hardware-based transceiver, and a computer-readable storage medium having instructions stored thereon. Responsive to execution of the instructions by the processor, the processor performs operations relating to user device-initiated requests for resource configuration. The operations include determining conditions related to communicating with a base station over a wireless connection. The operations also include selecting, based on the determined conditions, a mini-slot configuration for communicating with the base station. The operations further include transmitting, to the base station, a request to communicate with the base station via a mini-slot. The request identifies the selected mini-slot configuration.

In further aspects, a user device determines conditions related to communicating with a base station over a wireless connection. The user device selects, based on the determined conditions, a schedule for uplink and downlink OFDM symbols within a resource of the wireless connection. The user device then transmits, to the base station, a request to communicate with the base station, with the request identifying the selected schedule for the uplink and downlink OFDM symbols within the resource of the wireless connection. In some implementations, the user device may receive, in response to transmitting the request, a resource grant allocating resources for communicating over the wireless connection based on the selected schedule for the uplink and downlink OFDM symbols.

The details of one or more implementations are set forth in the accompanying drawings and the following description. Other features and advantages will be apparent from the description and drawings, and from the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

The details of one or more aspects of user device-initiated requests for resource configuration for wireless networks is described below. The use of the same reference numbers in different instances in the description and the figures indicate similar elements:

FIG. 8 illustrates an example method for requesting, by the user device, to communicate with the base station based on a selected numerology configuration of resources of a wireless connection.

DETAILED DESCRIPTION

Figure 1:
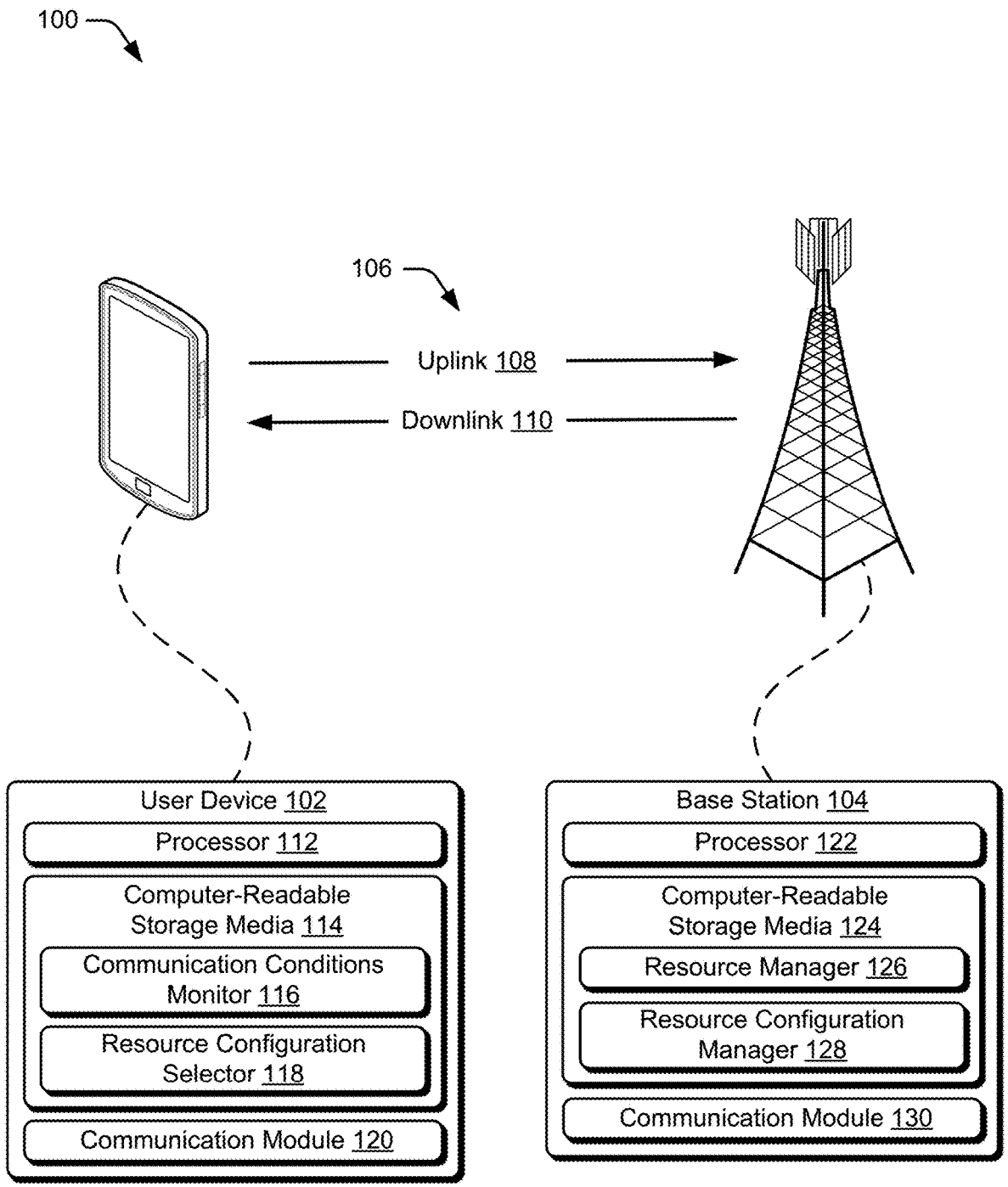
FIG. 1 illustrates example device configurations of a user device and a base station in accordance with one or more aspects of user device-initiated requests for resource configuration.

Base stations of wireless networks typically manage wireless connections with user devices by scheduling resources for communicating with the user devices. Recent advances in wireless communication technology allow a base station to provide various resource configurations for communications between a user device and the base station. For example, the resource configurations may include elements such as numerology configuration, mini-slot configuration, or a schedule for uplink and downlink OFDM symbols. Based on conditions at the user device, a particular resource configuration may be preferred by the user device. However, the base station may be unaware of the conditions at the user device, and may configure resources without consideration of the conditions.

This document describes techniques and systems for user device-initiated requests for resource configuration. User device-initiated requests for resource configuration includes a user device determining conditions for communicating with the base station, selecting a resource configuration, and transmitting a request to the base station for communicating based on the selected resource configuration. The conditions may be, for example, environmental conditions or internal conditions of the user device.

In an illustrative example, a user device communicates with a base station over a wireless connection. Here, assume that the user device detects a Doppler effect in communications received from the base station. Based on this condition, the user device determines a numerology that increases subcarrier spacing to reduce the Doppler effect. Additionally, the user device determines that the user device is also communicating via another wireless connection according to a schedule for the other wireless connection. The user device may also determine that simultaneous transmissions over both wireless connections would be undesirable based on, for example, double-scheduling a single transmission chain or exceeding a specific absorption rate (SAR) limit for radio frequency (RF) emissions. Based on this condition, the user device determines to communicate with the base station during a mini-slot scheduled to avoid simultaneous transmissions over both wireless connections. For example, the user device can select a mini-slot occupying a first portion of a slot based on the user device being scheduled to transmit over the other wireless connection during a second portion of the slot. The user device then transmits a request to the base station, with the request identifying the selected numerology and mini-slot configuration. Based on the request, the base station allocates resources for communicating with the user device and then transmits a resource grant to the user device that identifies the allocated resources.

The following discussion describes an operating environment and techniques that may be employed in the operating environment and/or network environment. In the context of the present disclosure, reference is made to the operating environment or networking environment by way of example only.

Operating Environment

FIG. 1 illustrates an example operating environment 100 in which devices for user device-initiated requests for resource configuration can be implemented. In this example, the operating environment includes a user device 102 and a base station 104 that are respectively configured to communicate over a wireless connection 106 of a wireless network. Generally, the wireless connection 106 includes an uplink 108 by which the user device 102 transmits data to the base station 104 and a downlink 110 by which the base station 104 transmits other data to the user device 102, such as application data or grants for further communications. Although shown or described with reference to a separate uplink 108 or downlink 110, communication between the user device 102 and base station 104 may also be referenced as a wireless association, a frame exchange, a wireless link, or a communication link.

The wireless connection 106 may be implemented in accordance with any suitable protocol or standard, such as a Global System for Mobile Communications (GSM), Worldwide Interoperability for Microwave Access (WiMax), a High Speed Packet Access (HSPA), Evolved HSPA (HSPA+) protocol, a long-term evolution (LTE) protocol, an LTE Advanced protocol, a $5^{th}$ Generation (5G) New Radio (NR) protocol, or a future advanced protocol. The protocol may operate based on frequency division duplexing (FDD) or time division duplexing (TDD). The wireless connection 106 may operate over a dynamic frequency bandwidth that can range from a high frequency bandwidth, such as a frequency bandwidth greater than 1 GHz, to a low frequency bandwidth, such as 2 MHz. Further, the wireless connection 106 may be configured to allow for operation at high frequencies, such as frequencies above 3 GHz, as well as lower frequencies, such as those between 0.5 GHz and 3 GHz.

The user device 102 includes a processor 112, computer-readable storage media (CRM) 114 having a communication conditions monitor 116 and a resource configuration selector 118, and a communication module 120. The user device 102 is illustrated as a smart phone, however the user device 102 may instead be implemented as any device with wireless communication capabilities, such as a mobile gaming console, a tablet, a laptop, an advanced driver assistance system (ADAS), a point-of-sale (POS) terminal, a health monitoring device, an unmanned aircraft, a camera, a media-streaming dongle, a wearable smart-device, an internet-of-things (IoT) device, a personal media device, a navigation device, a mobile-internet device (MID), a wireless hotspot, a femto-cell, a smart vehicle, or a broadband router.

The processor 112 of the user device 102 can execute processor-executable instructions or code stored by the CRM 114 to cause the user device 102 to perform operations or implement various device functionalities. In this example, the CRM 114 also stores processor-executable code or instructions for implementing one or more of the communication conditions monitor 116 or the resource configuration selector 118 of the user device 102. The communication conditions monitor 116 or the resource configuration selector 118 may be implemented as modules including one or more of hardware or software.

A processor, such as the processor 112, can be implemented as an application processor (e.g., a multicore processor) or a system-on-chip with other components of the user device 102 integrated therein. A CRM, such as the CRM 114, may include any suitable type of memory media or storage media, such as read-only memory (ROM), programmable ROM (PROM), random access memory (RAM), static RAM (SRAM), or Flash memory. In the context of this discussion, a CRM is implemented as hardware-based storage media, which does not include transitory signals or carrier waves. In some cases, a CRM stores one or more of firmware, an operating system, or applications of an associated device as instructions, code, or information. The instructions or code can be executed by an associated processor to implement various functionalities of the associated device, such as those related to wireless network communication.

In some aspects, the communication conditions monitor 116 monitors conditions, such as internal and environmental conditions that may impact communicating over the wireless connection 106. Internal conditions may include one or more of scheduled communications via another wireless connection (e.g., IEEE 802.11 or 802.15), an amount or type of data to be transmitted to or received from the base station 104, a thermal status of the user device 102, or a power status of the user device 102. Environmental conditions may include, for example, a Doppler effect in the wireless connection, phase noise of the wireless connection, a delay spread of the wireless connection, or other wireless signals detected at the user device 102.

Generally, the resource configuration selector 118 determines, based on the monitored conditions, one or more preferred elements of a resource configuration for communicating with the base station 104. For example, the resource configuration selector 118 may select a preferred numerology, including elements such as subcarrier spacing or a cyclic prefix configuration of an OFDM symbol. Additionally or alternatively, the resource configuration selector 118 may select a preferred mini-slot configuration including elements such as a quantity of OFDM symbols or a timing offset relative to a slot or subframe boundary that includes the mini-slot. In some implementations, the resource configuration selector 118 selects a schedule for uplink and downlink OFDM symbols within one or more resources of the wireless connection.

Using the communication module 120, the user device 102 can transmit a request to communicate with the base station 104, with the request identifying the selected resource configuration. The user device 102 may transmit the request as a radio resource control (RRC) message or a medium access control (MAC) message. Further, the user device 102 may transmit the request over currently allocated resources, a physical random access channel (PRACH), a supplemental uplink, or an uplink of another wireless connection, such as a wireless connecting communicating via a legacy radio access technology. The request may specify a selected resource configuration for the downlink 110 only, the uplink 108 only, or both the uplink 108 and the downlink 110. Additionally or alternatively, the request may include a requested schedule, based context such as time or location of the user device 102, for changing elements of the selected resource configuration, such as a cyclic prefix or a quantity of OFDM symbols of a mini-slot.

The communication module 120 of the user device 102 includes a hardware-based transceiver and associated circuitry or other components for communicating with the base station 104 via a wireless medium. For example, the communication module 120 may transmit, via a transmitter of the transceiver, data to the base station 104 over one or more channels of the uplink 108, such as a PRACH, a physical uplink control channel (PUCCH), or a physical uplink share channel (PUSCH). This data transmitted to the base station 104 may include any suitable type of framed or packetized information, such as a sounding reference signal (SRS), device-status information, wireless connection status information, wireless connection control information, data requests, application data, or network access requests. The communication module 120 may also receive, via a receiver of the transceiver, other data from the base station 104 over one or more channels of the downlink 110, such as a physical downlink control channel (PDCCH), a physical downlink share channel (PDSCH), or a physical hybrid automatic repeat request (HARQ) indicator channel (PHICH). This data may include one or more of application data, downlink pilots, primary or secondary synchronization signals (PSSs or SSSs), a master information block (MIB), a system information block (SIB), a downlink control information (DCI) message, a downlink grant, an uplink grant, wireless connection configuration settings, network control information, or a communication mode selection.

In this example, the base station 104 is shown generally as a cellular base station of a wireless network. The base station 104 may be implemented to provide and manage a cell of a wireless network that includes multiple other base stations that each manage another respective cell of the wireless network. As such, the base station 104 may communicate with a network management entity or others of the multiple base stations to coordinate connectivity or handoffs of mobile stations within or across the cells of the wireless network.

The base station 104 can be configured as any suitable type of base station or network management node, such as a GSM base station, a node base (Node B) transceiver station (e.g., for UMTS), an evolved NodeB (eNB, e.g., for LTE), or a next generation Node B (gNB, e.g., for 5G NR). As such, the base station 104 may control or configure parameters of the uplink 108 or the downlink 110 in accordance with one or more of the wireless standards or protocols described herein. In at least some aspects, the base station 104 configures parameters or allocates resources to the uplink 108 and/or downlink 110 of the wireless connection 106 based on a request received from the user device 102.

The base station 104 includes a processor 122, a computer-readable storage media (CRM) 124 having a resource manager 126 and a resource configuration manager 128, and a communication module 130. In this example, the CRM 124 also stores processor-executable code or instructions for implementing the resource manager 126 and the resource configuration manager 128 of the base station 104.

In some aspects, the resource manager 126 of the base station 104 is implemented to perform various functions associated with allocating physical access (e.g., resource blocks) or resources of the wireless connection available to the base station 104. The physical access, such as an air interface of the base station 104, may be partitioned or divided into various units (e.g., frames) of one or more of frequency bandwidth, time, symbols, or spatial layers. For example, within a framework of a 5G NR protocol, the resource manager 126 can allocate frequency bandwidth and time intervals of access in resource blocks, each of which may be allocated in whole, or in part, to one or more channels for communicating with the user device 102. The resource blocks may include multiple subcarriers, each of which spans a portion of a frequency domain of the resource blocks (e.g., 15 kHz, 30 kHz, 60 kHz, 120 kHz, or 240 kHz). These subcarriers may be spaced according to a configuration by the resource configuration manager 128. The subcarriers may be further divided into resource elements, or OFDM symbols, each of which spans a portion of a time domain of the subcarriers. Consequently, a resource block includes multiple OFDM symbols that can be grouped into subcarriers with other OFDM symbols having a common frequency.

In some aspects, the resource configuration manager 128 receives, from the user device 102, a request to communicate with the base station 104 based on a selected resource configuration for the communication module 130 or resources of the wireless network. The resource configuration manager 128 determines whether the request can be granted by the base station 104. For example, the base station 104 may grant or reject a request for increased subcarrier spacing based on availability of frequency bandwidth adjacent to a frequency bandwidth of the wireless connection. The base station 104 may grant or reject a mini-slot configuration or a schedule for uplink and downlink OFDM symbols based on existence of conflicting operations of the base station 104, such as communicating with other user devices. The resource configuration manager 128 may recommend, to the resource manager 126, granting one or more elements of the request. The resource configuration manager 128 may further determine a proposed alternate resource configuration for transmitting to the user device 102. In some implementations, the resource configuration manager 128 recommends changing a location of the frequency bandwidth used to implement the wireless connection 106, based on the request or a rejection of the request.

Generally, the resource manager 126 allocates, based on one or more of the request and the recommendation of the resource configuration manager 128, resources with a resource configuration. The base station 104 can then transmit, via the communication module 130, an associated resource grant to the user device 102 indicating the resource configuration of the allocated resources. The communication module 130 includes a hardware-based transceiver that includes a receiver, a transmitter, and associated circuitry or other components for communicating with the user device 102 via the wireless medium. The communication module 130 may be configured to communicate over one or more frequency bandwidths of the wireless medium and over multiple spatial layers and beams. In some cases, the communication module 130 includes, or is coupled with, multiple hardware-based transceivers and antenna arrays that are configured to establish and manage wireless connections with multiple user devices over one or more frequency bandwidths. The base station 104 may communicate, over one or more channels, any suitable data with the user device 102 through the uplink 108 and the downlink 110, such as a schedule of allocated resources, downlink pilots, application data, wireless connection status information, or wireless connection control information.

Figure 2:
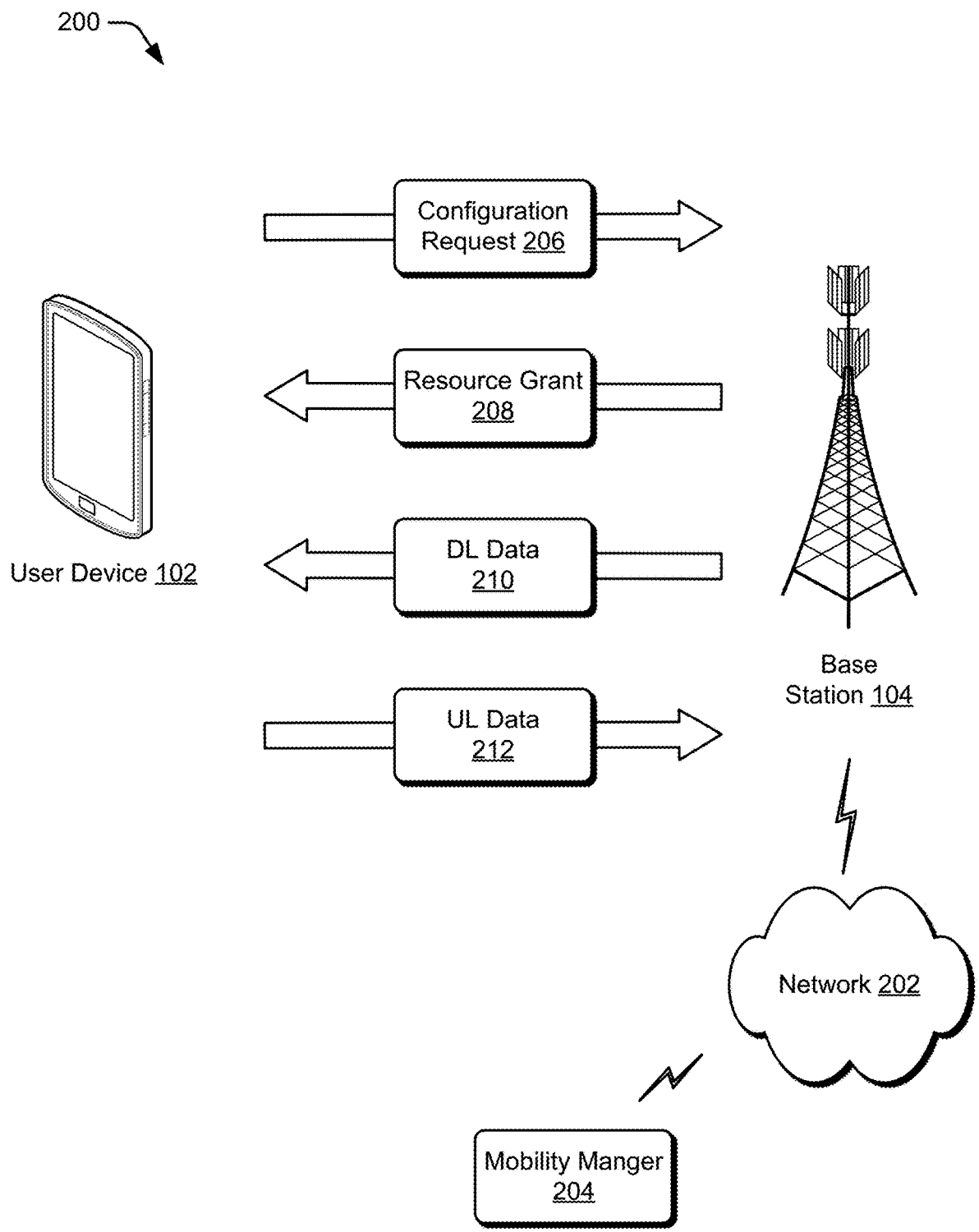
FIG. 2 illustrates an example networking environment in which the user device and base station may communicate in accordance with one or more aspects of user device-initiated requests for resource configuration.

FIG. 2 illustrates an example networking environment 200 in which a user device and a base station may communicate in accordance with one or more aspects of user device-initiated requests for resource configuration. The network environment 200 includes respective instances of the user device 102 and the base station 104, which provides a wireless network with which the user device 102 and other user devices may associate. Through the wireless network, the base station 104 may enable or provide access to other networks or resources, such as a network 202 (e.g., the Internet) connected via a backhaul link (e.g., fiber network). Additionally or alternately, the networking environment 200 may include other base stations or a mobility manager 204, such as a mobility management entity (MME) or an access and mobility management function (AMF), to provide an area wide wireless network, such as a 5G NR network and associated data services.

In this example, the user device 102 transmits, to the base station 104, a resource configuration request 206. For example, the resource configuration request 206 may be transmitted over a channel of the wireless connection 106, such as a PUCCH or a PRACH. The resource configuration request 206 may include a schedule, based on context such as a duration of time or a presence at a location, during which the user device 102 requests to communicate according to the requested resource configuration. For example, the resource configuration request 206 may provide a requested schedule for communicating with a short cyclic prefix or a long cyclic prefix.

Based on the resource configuration request 206, the base station 104 determines whether the selected resource configuration is granted or rejected. The base station 104 then transmits a resource grant 208 to the user device 102 that indicates which, if any, elements of the selected resource configuration are granted. The base station 104 may indicate a grant or rejection of elements of the selected resource configuration within the resource grant 208 (or a configuration request response, not shown). Alternatively, the base station 104 may indicate a grant or rejection within a separate DCI message, for dynamic resource configurations, or within a medium access (MAC) message or radio resource control (RRC) message, for static or semi-static resource configurations. Further, the base station 104 may transmit the resource grant 208 directly, such as over a PDCCH of the wireless connection 106, or indirectly, such as over another wireless connection via another radio access technology. The resource grant 208 may further confirm or reject other requests within the resource configuration request 206, such as a schedule for changing the resource configuration over time.

The base station 104 transmits downlink (DL) data 210 to the user device 102 over the downlink resources, and based on the resource configuration, identified in the resource grant 208. The base station 104 may transmit the downlink data 210 over a channel of the wireless connection 106 such as a PDSCH or a PDCCH. The user device 102 transmits uplink (UL) data 212 to the base station 104 over uplink resources, and based on the resource configuration, identified in the resource grant 208.

Figure 3:
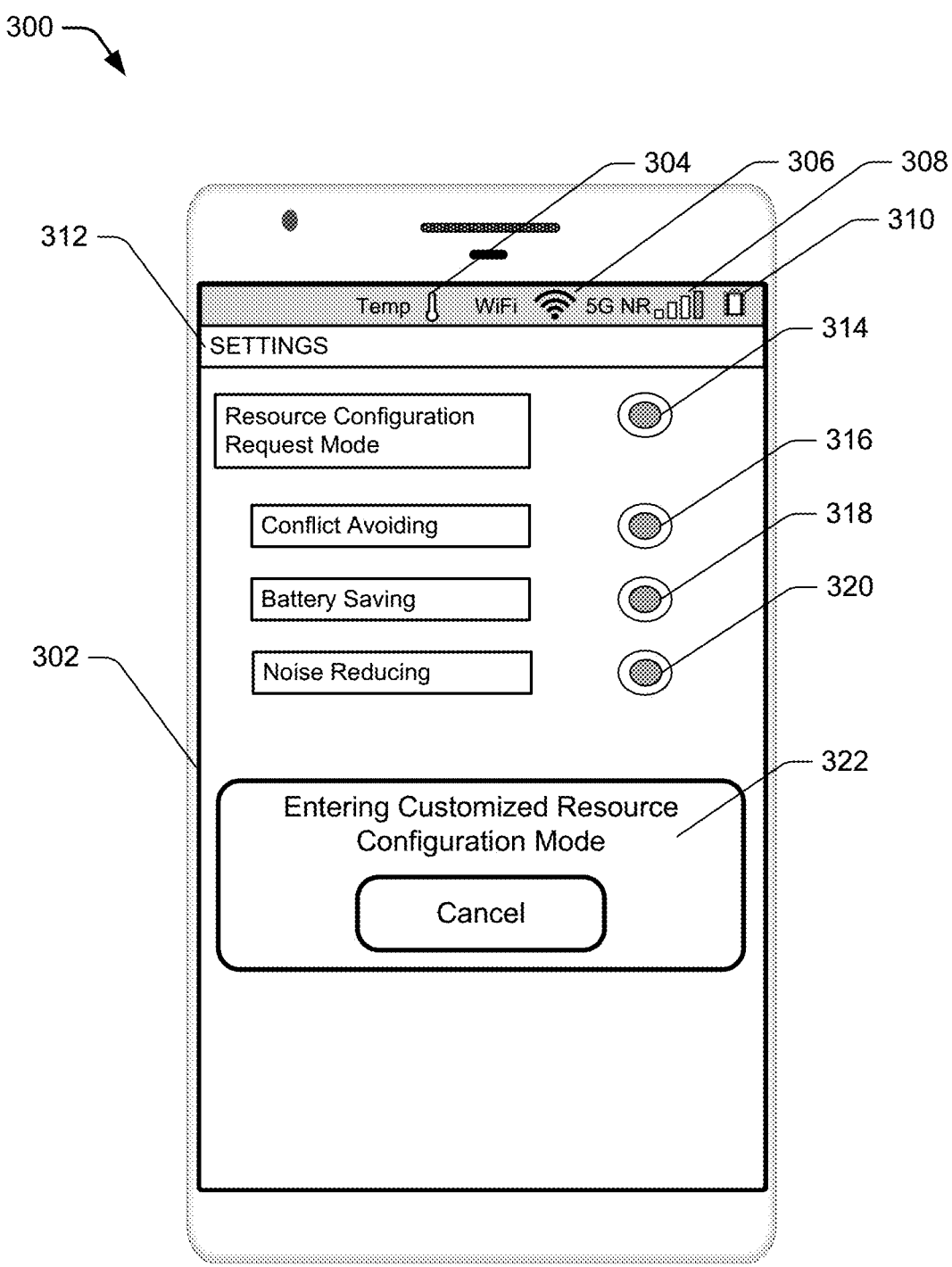
FIG. 3 illustrates an example user interface of the user device in accordance with one or more aspects of user device-initiated requests for resource configuration.

FIG. 3 illustrates an example user interface 300 of an instance of the user device 102 through which one or more aspects of user device-initiated requests for resource configuration can be implemented. In this example, the user interface 300 is presented through a visible portion of a display 302 for providing output to a user. The display 302 may also include, or be integrated with, a touch screen or touch-sensitive overlay for receiving touch input from the user. The display 302 may also display one or more of a thermal status indicator 304 of the device (shown as "temp"), an indicator 306 of another wireless connection (shown as a WiFi connection) of the user device 102, an indicator 308 of the wireless connection 106 (shown as 5G NR), or a power status indicator 310. In the context of user device-initiated requests for resource configuration, the indicators 304, 306, 308 and 310 represent one or more of the findings of the communication conditions monitor 116. For example, the communication conditions monitor 116 can detect a communication schedule for communicating via the other wireless connection identified by the indicator 306. Additionally, the communication conditions monitor 116 may detect a high temperature as indicated by the thermal status indicator 304 or a low battery charge level as indicated by the power status indicator 310.

In some implementations, the display 302 provides or makes accessible a settings menu 312 through which the user interface 300 can receive input 314 to select a customized resource configuration mode. The settings menu 312 can receive additional inputs 316, 318, and 320 to select one or more modes for user device-initiated requests for resource configuration. As shown in FIG. 3, the inputs 316, 318, and 320 enable selections of example modes including wireless connection conflict avoiding (conflict avoiding), battery saving, and noise reducing modes, respectively.

Additionally or alternatively, the user device 102 may provide a notification 322 via the user interface 300 to indicate that the user device 102 is entering the customized resource configuration mode (e.g., based on user input). The notification 322 is illustrated in this example as a pop-up notification in the display 302, however, other forms of the notification 322 may be implemented in addition or in alternative to the pop-up notification. For example, the user device 102 may provide an audible notification, a visible notification via a light emitting diode (LED) indicator that is separate from the display 302, or a motion-based notification such as a vibration of the user device 102.

The user interface 300 is but one of many possible user interfaces for implementing user device-initiated requests for resource configuration. Although the user device 102 is illustrated as a smart phone with a touch screen, alternative user interfaces may be implemented by the user device 102. For example, the user device 102 may be implemented as a laptop with a user interface. The user interface of the laptop may include, for example, one or more of a mouse, a track pad, a keyboard, a microphone, a monitor, a projector screen, or speakers. In some implementations, the user interface does not include the settings menu 312 for receiving the inputs 314, 316, 318, or 320, but rather, the user device 102 enters the customized resource configuration mode automatically and without receiving user input.

Figure 4:
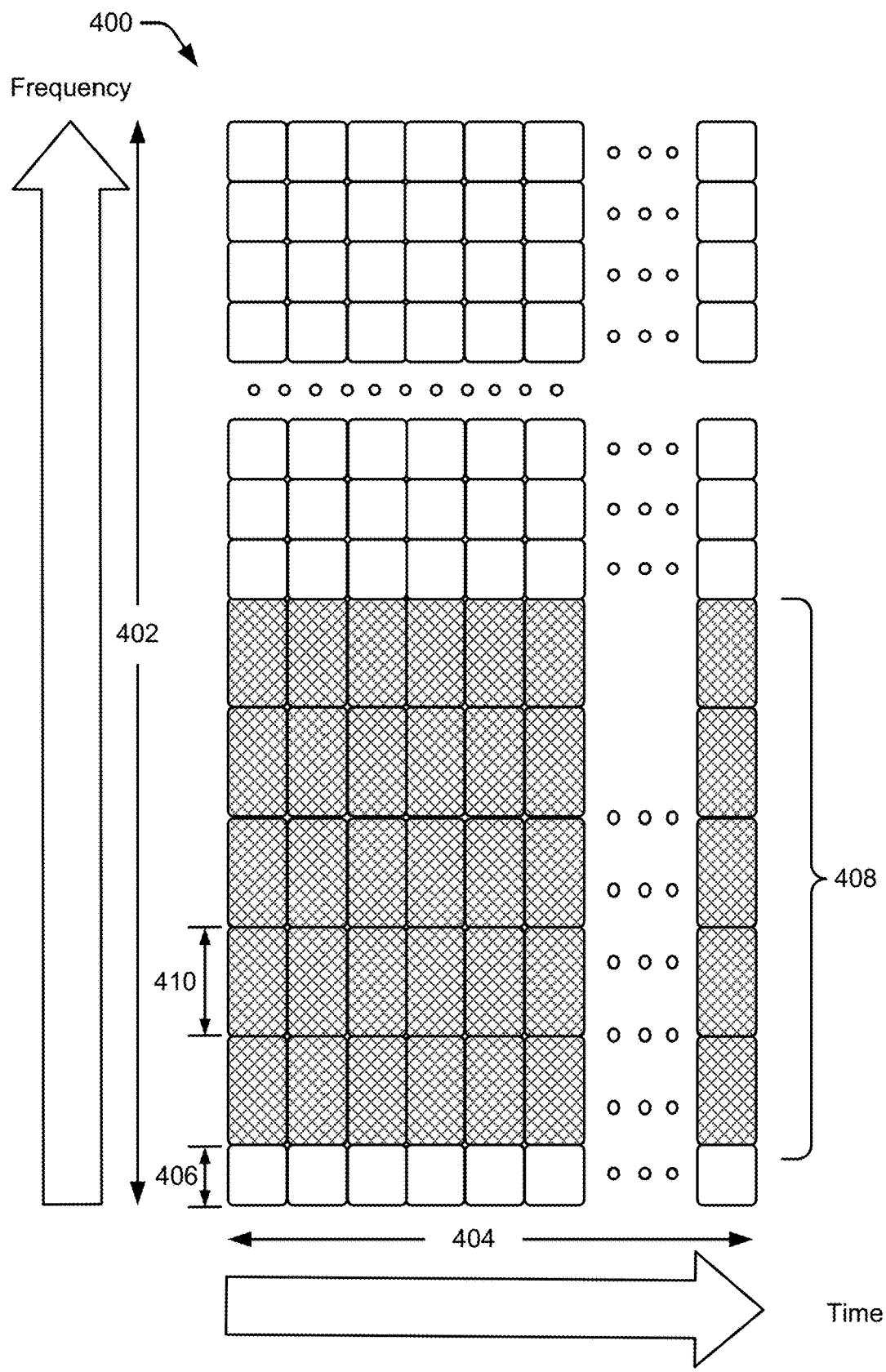
FIG. 4 illustrates example resources with subcarrier spacing configured for communication between the user device and the base station.

FIG. 4 illustrates an example set 400 of resources available to the base station 104 for communicating with user devices. The set 400 of resources, available to the base station 104 for communicating with associated user devices, span a frequency bandwidth 402 and a time interval 404. The resources span a frequency bandwidth 406 that is a portion of the frequency bandwidth 402 of the set 400. The frequency bandwidth 406 may be dynamically determined by the base station 104 and may vary for different resources of the set 400.

The resource configuration request 206 may include a requested numerology identifying a subcarrier spacing for the wireless connection 106. As illustrated, resources within a portion 408 of the frequency bandwidth 402, which includes a portion or all resources allocated to the user device 102, span a wider frequency bandwidth 410 than the frequency bandwidth 406 of the standard resource. This represents an increase of subcarrier spacing for communication resources allocated to the wireless connection 106. However, a resource, such as a resource block, may instead have a reduced quantity of subcarriers within the resource to achieve an increased subcarrier spacing without spanning a wider frequency bandwidth.

The increased subcarrier spacing may be a multiple of a standard subcarrier spacing. For example, if the standard subcarrier spacing is 15 kHz, the increased subcarrier spacing may be any of 30 kHz, 45 kHz, 60 kHz, 120 kHz, or 240 kHz. The user device 102 may request the increased subcarrier spacing based on, or in response to detecting, a Doppler effect. A Doppler effect may be produced when a change occurs in a transmission distance of a beam path of the wireless connection 106. For example, the transmission distance can change when the user device 102 is in motion relative to the base station 104, such as while in a car or on a train. The transmission distance can also change based on movements of objects off of which the beam path reflects. The changing transmission distance causes the user device 102 to receive a downlink transmission at a frequency that is shifted from a frequency at which the downlink transmission is transmitted by the base station 104. When the Doppler effect shifts the frequency by a large amount, relative to the subcarrier spacing, the user device 102 may be unable to determine over which subcarrier the downlink transmission was transmitted. This can result in an inability to, or difficulty in, decoding the downlink transmission. For this reason, if the user device 102 detects a relatively large Doppler effect, it may request an increased subcarrier spacing.

Similarly, the user device 102 may request in increased subcarrier spacing based on detecting a high phase noise. Phase noise can be generated as spurious signals at frequencies near a desired transmission frequency. For example, if the base station 104 intends to transmit a downlink communication at a frequency of 3 GHz, imperfections of the communication module 130 will likely produce phase noise at frequencies near the intended frequency. This phase noise significantly decreases as a distance in the frequency domain from the desired transmission frequency increases. For this reason, if the user device 102 detects a relatively high phase noise, it may request an increased subcarrier spacing to decrease an effect of phase noise on transmissions over one subcarrier from other transmissions over an adjacent subcarrier.

Figure 5:
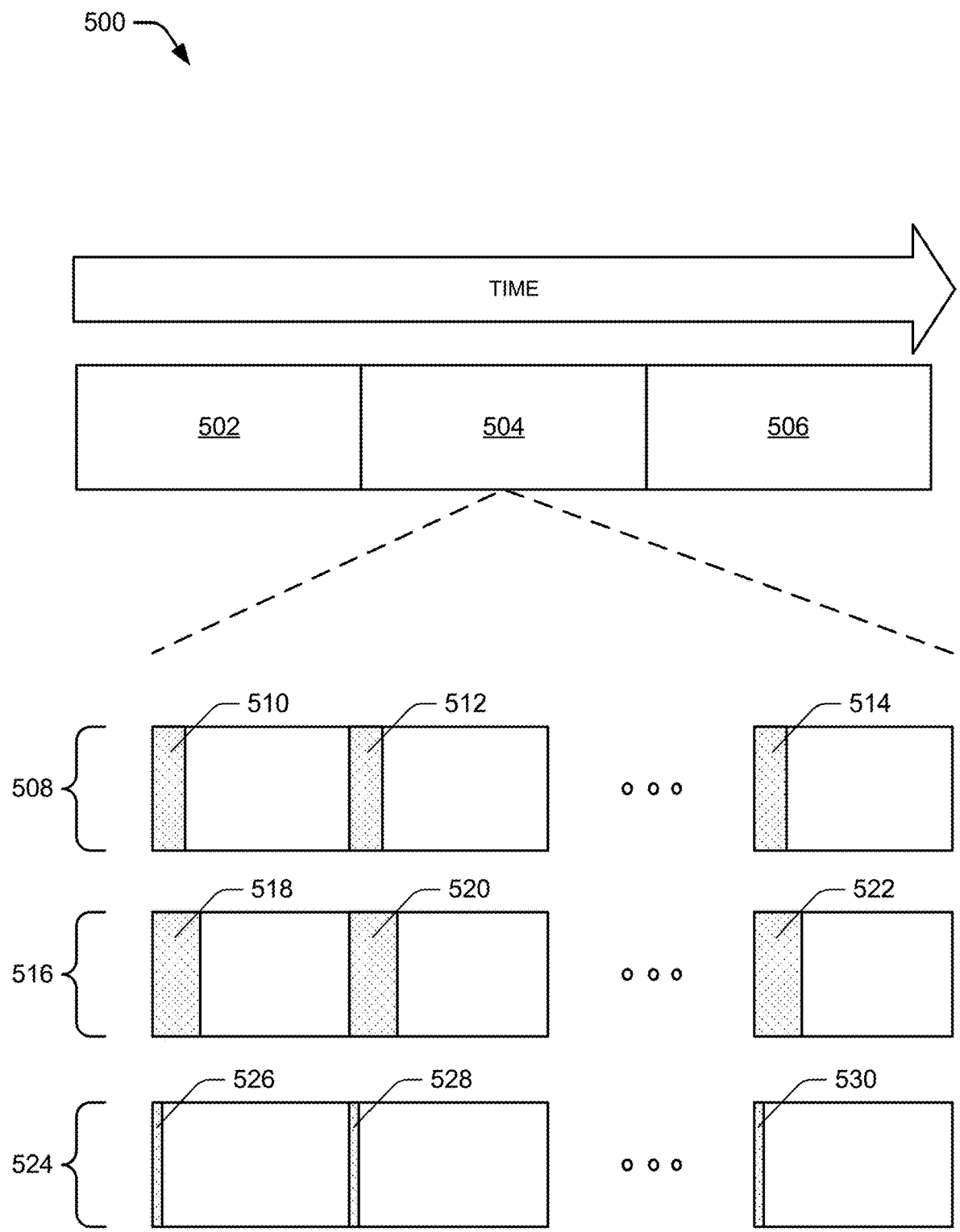
FIG. 5 illustrates example resources with cyclic prefixes configured for communication between the user device and the base station.

FIG. 5 illustrates other example configurations of a set 500 of resources available for communication between the user device 102 and the base station 104. The set 500 may be included in the resource configuration request 206 indicating a request to select a numerology configuration. More particularly, the request to select the numerology configuration identifies a selection of a cyclic prefix for one or more resources of the wireless connection 106. The set 500 includes resources 502, 504, and 506 that include one or more OFDM symbols. For example, the resources 502, 504, and 506 may be a data frame, a subframe, a slot, or a subcarrier.

The resource configuration request 206 can define a cyclic prefix, or may choose from available configurations for cyclic prefixes. Further, the resource configuration request 206 may request a cyclic prefix for all OFDM symbols of the wireless connection 106, individual channels of the wireless connection 106, or individual resource blocks of the wireless connection. A configuration 508 includes a configuration of cyclic prefixes 510, 512, and 514 that indicate a beginning of OFDM symbols of the resource 504. A configuration 516 includes another configuration of cyclic prefixes 518, 520, and 522 that indicate a beginning of OFDM symbols of the resource 504. A configuration 524 includes another configuration of cyclic prefixes 526, 528, and 530 that indicate a beginning of OFDM symbols of the resource 504. The configuration 516 includes relatively long cyclic prefixes, the configuration 524 includes relatively short cyclic prefixes, and the configuration 508 includes cyclic prefixes between the two in length. The configurations 508, 516, and 524 may represent standard cyclic prefixes from which the user device 102 can choose. Alternatively, the user device 102 may generate a desired cyclic prefix, or a length thereof, that is not a standard cyclic prefix.

A cyclic prefix indicates, to the user device 102 when an OFDM symbol begins. This can be important for a user device 102 receiving a transmission from the base station 104 having a long delay spread between receiving different parts of the transmission intended to be received at a same time. This delay spread of the transmission can be affected by multipath conditions for the wireless connection 106. For a long delay spread, a long cyclic prefix, such as that of the configuration 516, is desirable for improving a success rate of decoding data of the transmission. However, for a small delay spread, a long cyclic prefix is unnecessary. An unnecessarily long cyclic prefix uses portions of the OFDM symbol that could otherwise be used to carry other types of data, such as application data. For this reason, if the user device 102 detects a relatively short delay spread, the user device 102 can request a relatively short cyclic prefix to vacate portions of the OFDM symbol that can instead carry other data. Conversely, if the user device 102 detects a relatively long delay spread, the user device 102 can request a relatively long cyclic prefix to improve decoding of data transmitted over the OFDM symbol.

Figure 6:
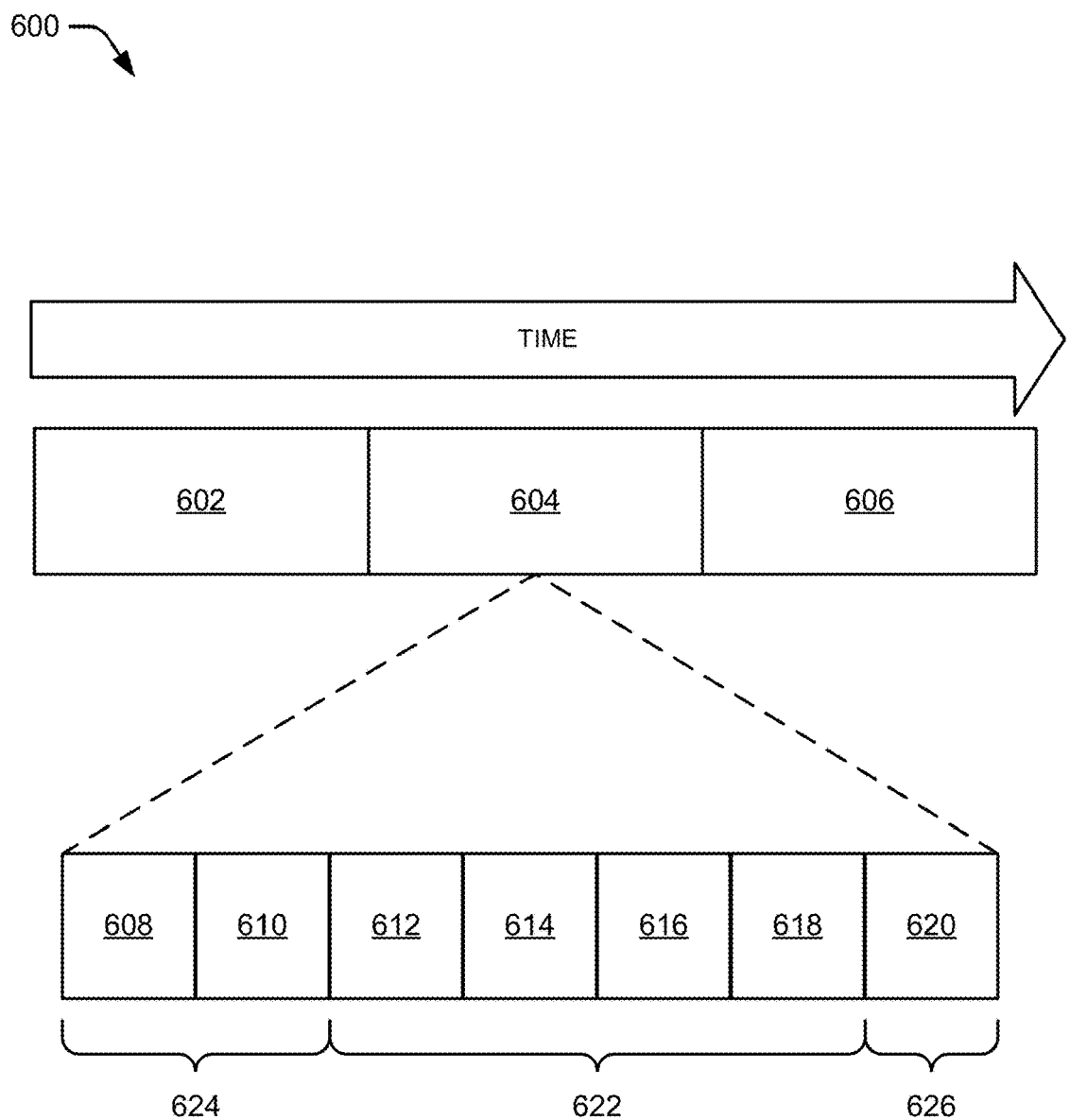
FIG. 6 illustrates example resources configured as a mini-slot for communication between the user device and the base station.

FIG. 6 illustrates other example configurations of a set 600 of resources available for communication between the user device 102 and the base station 104. The set 600 may be included in the resource configuration request 206 indicating a request to select a mini-slot configuration. The set 600 includes resources 602, 604, and 606 that include OFDM symbols. For example, the resources 602, 604, and 606 may be a data frame, a subframe, a slot, or a subcarrier. As shown in FIG. 6, the resource 604 in this example includes OFDM symbols 608, 610, 612, 614, 616, 618, and 620.

A resource configuration request 206 that includes a mini-slot configuration request may specify one or more of a quantity of OFDM symbols in a mini-slot, a time-location of the mini-slot within a slot including the mini-slot, or a schedule for uplink and downlink OFDM symbols within the mini-slot. For example, the mini-slot configuration request may identify a portion 622 as the mini-slot, which includes four OFDM symbols 612 through 618. The mini-slot has a timing offset 624 of two OFDM symbols from a beginning boundary of a slot of the resource 604 that includes the mini-slot, or in which the mini-slot is implemented, and a timing offset 626 of one OFDM symbol from an ending boundary of the slot. In other implementations, the portion 622 may be offset or indexed from only one boundary of the slot of the resource 604.

The user device 102 may request a mini-slot configuration to avoid a conflict with a communication via another wireless connection of the user device 102. For example, the user device 102 may receive a schedule for communicating via an LTE-based wireless connection. The user device 102 may attempt to avoid conflicting transmissions over both wireless networks to avoid double-scheduling a single transmission chain or exceeding a specific absorption rate (SAR) limit for emitted transmission radiation. Additionally or alternatively, the user device 102 may request a mini-slot configuration to reduce power consumption or reduce heat generation at the user device 102.

Figure 7:
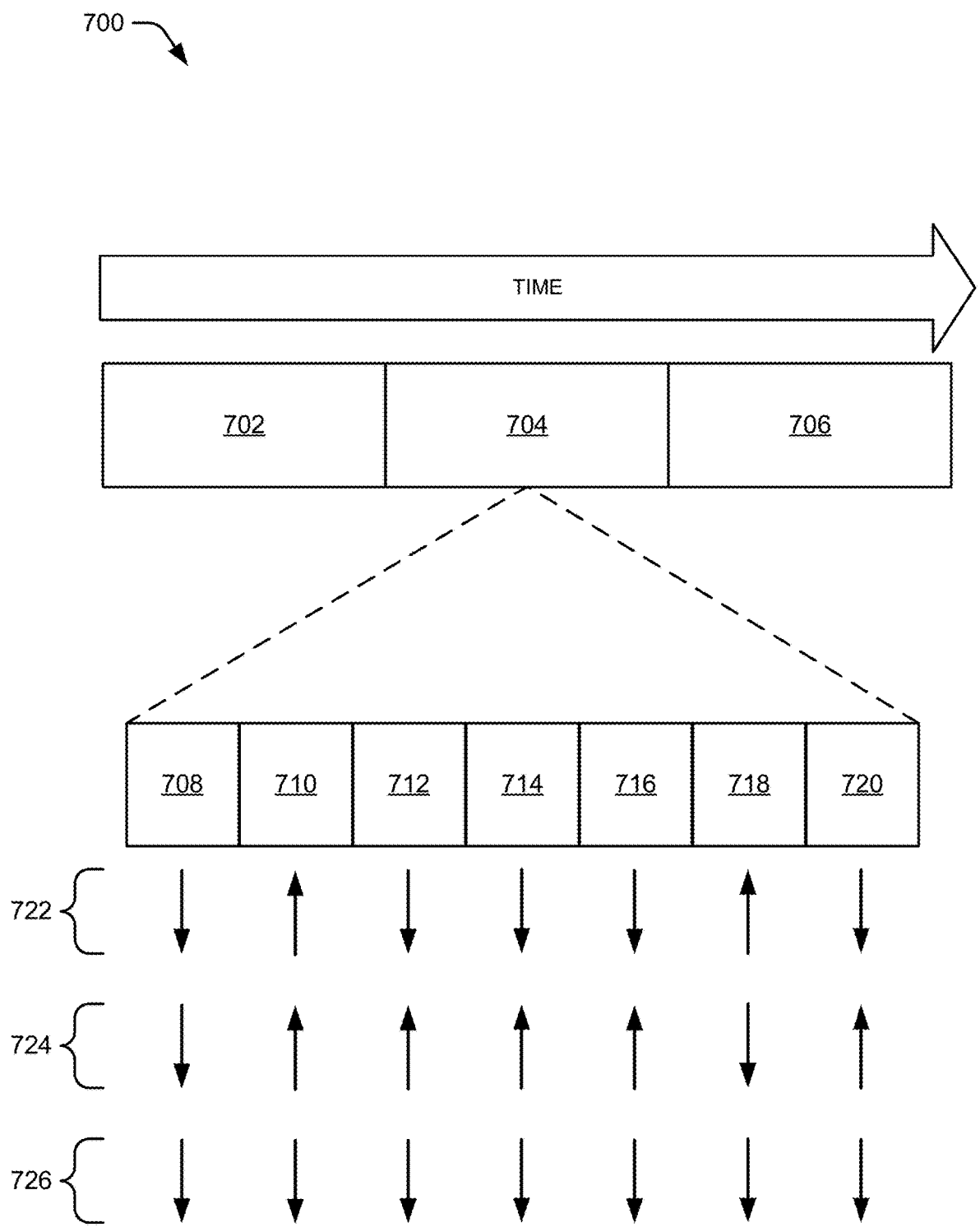
FIG. 7 illustrates example schedules of uplink and downlink OFDM symbols for communication between the user device and the base station.

FIG. 7 illustrates other example configurations of a set 700 of resources available for communication between the user device 102 and the base station 104. The set 700 may be included in a resource configuration request 206 indicating a request to select a schedule for uplink and downlink OFDM symbols. The set 700 includes resources 702, 704, and 706 that include OFDM symbols. For example, the resources 702, 704, and 706 may be a data frame, a subframe, a slot, or a subcarrier. As shown in FIG. 7, the resource 704 includes OFDM symbols 708, 710, 712, 714, 716, 718, and 720.

The resource configuration request 206 can define a schedule for uplink and downlink OFDM symbols, or may choose from available schedules for uplink and downlink OFDM symbols. Further, the resource configuration request 206 may request the schedule for all resources of the wireless connection 106, individual channels of the wireless connection 106, or individual resource blocks of the wireless connection. Here, an example schedule 722 includes five downlink OFDM symbols and two uplink OFDM symbols. This schedule may be determined based on one or more of a requested quantity of uplink OFDM symbols, a requested quantity of downlink OFDM symbols, or a requested time-location of one or both of uplink or downlink OFDM symbols. Another schedule 724 includes two downlink OFDM symbols and five uplink OFDM symbols and yet another schedule 726 includes seven downlink OFDM symbols and no uplink OFDM symbols (e.g., for higher downlink throughput).

The user device 102 may request the schedule for uplink and downlink OFDM symbols based on another wireless connection between the user device 102 and another device or provider. For example, the user device 102 may transmit request in an effort to avoid simultaneous or conflicting transmissions. Additionally or alternatively, the user device 102 may request the schedule for uplink and downlink OFDM symbols based on an amount of data expected to be transmitted or received via the wireless network, based on conditions at the user device 102. For example, the user device 102 may request the schedule 726 when streaming a video over the wireless connection 106. The user device 102 may instead request the schedule 724 when gaming over the wireless connection 106.

Techniques for User Device-Initiated Requests for Resource Configuration

Figure 9:
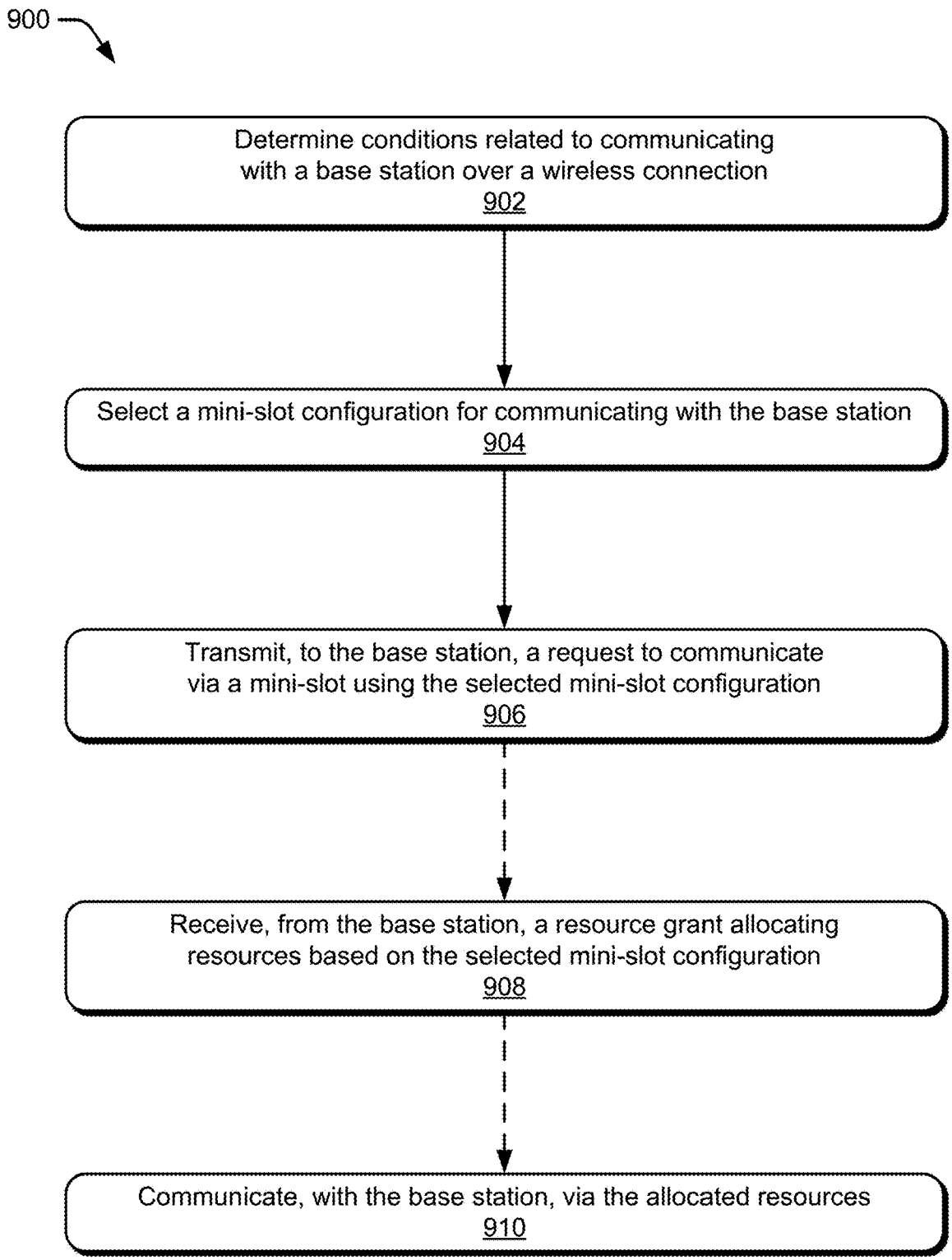
FIG. 9 illustrates an example method for requesting, by the user device, to communicate with the base station via a selected mini-slot configuration.
Figure 10:
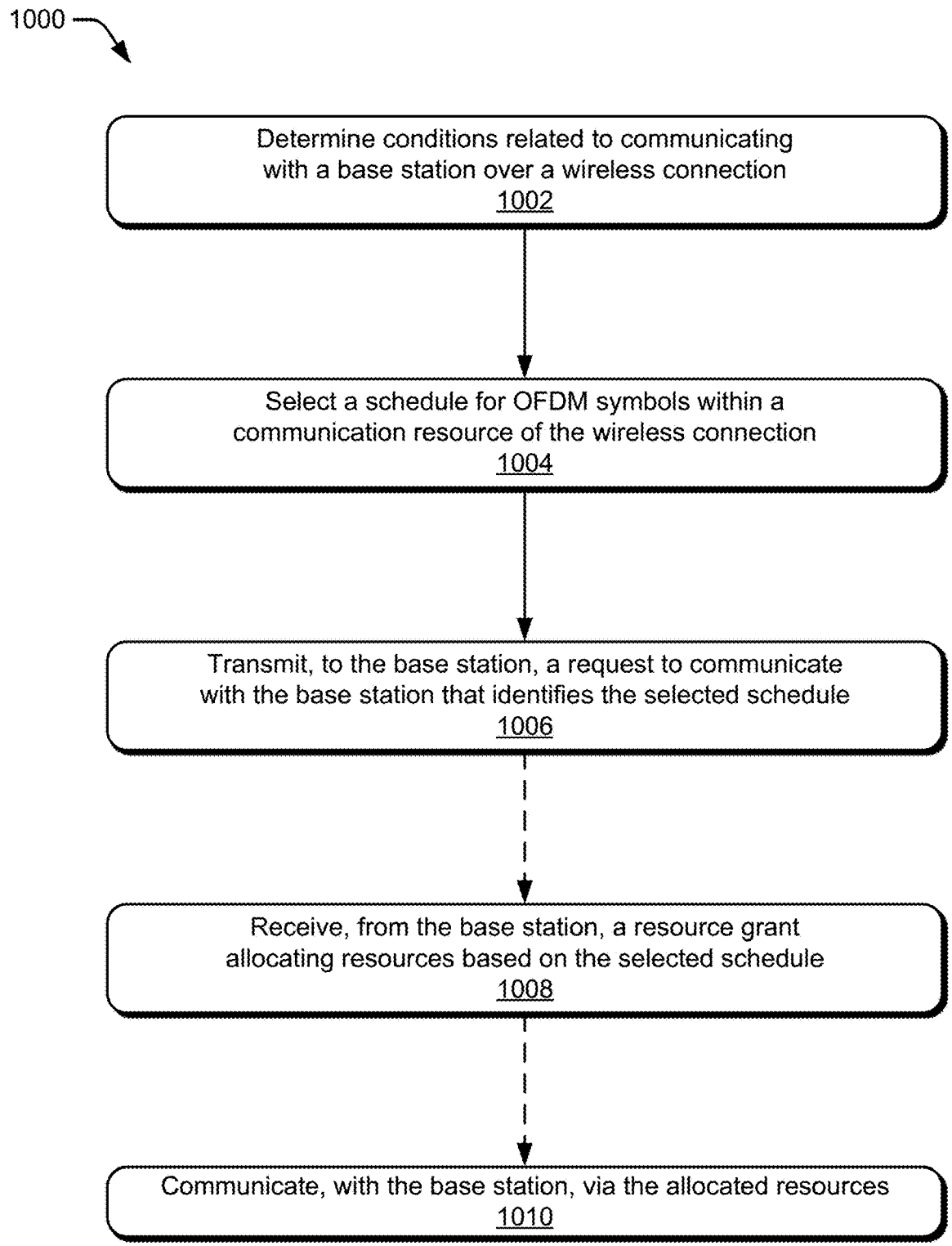
FIG. 10 illustrates an example method for requesting, by the user device, to communicate with the base station based on a selected schedule of OFDM symbols within a resource of a wireless connection with the base station.

FIGS. 8-10 depict methods for implementing user device-initiated requests for resource configuration. These methods are shown as sets of blocks that specify operations performed but are not necessarily limited to the order or combinations shown for performing the operations by the respective blocks. For example, operations of different methods may be combined, in any order, to implement alternate methods without departing from the concepts described herein. In portions of the following discussion, the techniques may be described in reference to FIGS. 1-7, reference to which is made for example only. The techniques are not limited to performance by one entity or multiple entities operating on one device, or those described in these figures.

FIG. 8 illustrates an example method 800 performed by a user device for implementing user device-initiated requests for resource configuration. The method 800 includes operations that may be performed by a communication conditions monitor, a resource configuration selector, and a communication module. For example, the operations may be performed by one or more of the communication conditions monitor 116, the resource configuration selector 118, and the communication module 120. In some aspects, operations of the method 800 may improve an experience at the user device 102 by allowing the user device 102 to influence a numerology configuration that is better suited for communication over the wireless connection 106.

At operation 802, the user device determines conditions related to communicating with a base station over a wireless connection or wireless channel. For example, the user device 102 detects one or more conditions such as internal conditions or environmental conditions (e.g., wireless channel conditions) that influence a user experience at the user device 102 for communicating over the wireless connection 106.

At operation 804, the user device selects a numerology configuration of resources of the wireless connection for communicating with the base station. The selecting is based on the determined conditions. For example, the user device 102 selects the numerology configuration based on detecting a Doppler effect, phase noise, or a delay spread of the wireless connection at the user device 102.

At operation 806, the user device transmits, to the base station, a request to communicate based on the selected numerology configuration. For example, the user device 102 identifies the selected numerology configuration within the resource configuration request 206 that is transmitted to the base station 104. The selected numerology configuration may include one or both of subcarrier spacing or a length of a cyclic prefix for resources of the wireless connection 106.

At optional operation 808, the user device receives, from the base station, a resource grant allocating resources for communicating with the base station over the wireless connection. The resource grant allocates the resources based on the selected numerology. For example, the user device 102 receives the resource grant 208 identifying resources for communicating over the wireless connection 106 and identifying a numerology configuration for the identified resources.

At optional operation 810, the user device communicates with the base station via the allocated resources identified in the resource grant. For example, the user device 102 communicates with the base station 104 via allocated resources indicated in the resource grant 208.

FIG. 9 illustrates an example method 900 performed by a user device for user device-initiated requests for resource configuration. The method 900 includes operations that may be performed by a communication conditions monitor, a resource configuration selector, and a communication module. For example, the operations may be performed by one or more of the communication conditions monitor 116, the resource configuration selector 118, and the communication module 120. In some aspects, operations of the method 900 may improve an experience at the user device 102 by allowing the user device 102 to request a mini-slot configuration that is better suited for communication over the wireless connection 106.

At operation 902, the user device determines conditions related to communicating with a base station over a wireless connection. For example, the user device 102 detects one or more conditions such as internal conditions or environmental conditions that influence a user experience at the user device 102 for communicating over the wireless connection 106.

At operation 904, the user device selects a mini-slot configuration for communicating with the base station. The selecting is based on the determined conditions, such as the internal conditions or environmental conditions that affect communication with the base station or influence a user experience at the user device. For example, the user device 102 selects the mini-slot configuration to avoid a conflict with a communication via another wireless connection such as an LTE-based wireless connection or a WiFi-based wireless connection.

At operation 906, the user device transmits, to the base station, a request to communicate via a mini-slot using the selected mini-slot configuration. For example, the user device 102 can identify the mini-slot configuration within the resource configuration request 206 that is transmitted to the base station 104. The selected mini-slot configuration may include one or more of a quantity of OFDM symbols in, or duration of, the mini-slot or a timing offset or index of the mini-slot relative to a boundary of a slot that includes the mini-slot.

At optional operation 908, the user device receives, from the base station, a resource grant allocating resources for communicating with the base station over the wireless connection. The resource grant allocates the resources based on the selected mini-slot configuration. For example, the user device 102 receives the resource grant 208 identifying resources for communicating over the wireless connection 106 and identifying a mini-slot configuration for the identified resources.

At optional operation 910, the user device communicates with the base station via the allocated resources identified in the resource grant. For example, the user device 102 communicates with the base station 104 via allocated resources indicated in the resource grant 208.

FIG. 10 illustrates an example method 1000 performed by a user device for user device-initiated requests for resource configuration. The method 1000 includes operations that may be performed by a communication conditions monitor, a resource configuration selector, and a communication module. For example, the operations may be performed by one or more of the communication conditions monitor 116, the resource configuration selector 118, and the communication module 120. In some aspects, operations of the method 1000 may improve an experience at the user device 102 by allowing the user device 102 to request a schedule for uplink and downlink OFDM symbols within a resource of the wireless connection 106.

At operation 1002, the user device determines conditions related to communicating with a base station over a wireless connection. For example, the user device 102 detects one or more conditions such as internal conditions or environmental conditions that influence a user experience at the user device 102 for communicating over the wireless connection 106.

At operation 1004, the user device selects a schedule for uplink and downlink OFDM symbols within a resource of the wireless connection. The selecting is based on the determined conditions. For example, the user device 102 selects the schedule for uplink and downlink OFDM symbols to avoid a conflict with a communication via another wireless connection such as an LTE-based wireless connection or a WiFi-based wireless connection.

At operation 1006, the user device transmits, to the base station, a request to communicate with the base station. The request to communicate with the base station identifies the selected schedule for uplink and downlink OFDM symbols. For example, the user device 102 identifies the selected schedule for uplink and downlink OFDM symbols within the resource configuration request 206 that is transmitted to the base station 104. The selected schedule for uplink and downlink OFDM symbols may include a schedule for all resources, resource of identified channels, or resources of identified resource blocks of the wireless connection 106.

At optional operation 1008, the user device receives, from the base station, a resource grant allocating resources for communicating with the base station over the wireless connection. The resource grant allocates the resources based on the selected schedule for uplink and downlink OFDM symbols. For example, the user device 102 receives the resource grant 208 identifying resources, and an associated uplink and downlink schedule, for communicating over the wireless connection 106.

At optional operation 1010, the user device communicates with the base station via the allocated resources identified in the resource grant. For example, the user device 102 communicates with the base station 104 via allocated resources indicated in the resource grant 208.

Although techniques using, and apparatuses for implementing, user device-initiated requests for resource configuration have been described in language specific to features and/or methods, it is to be understood that the subject of the appended claims is not necessarily limited to the specific features or methods described. Rather, the specific features and methods are disclosed as example ways in which user device-initiated requests for resource configuration can be implemented.

What is claimed is:

1. A method performed by a user device to implement a user device-initiated request for resource configuration, the method comprising:
    determining, by the user device, a wireless connection environmental condition comprising at least one of a delay spread, a Doppler effect, or a phase noise related to downlink transmissions received from a base station over a wireless connection;
    selecting, by the user device and based on the determined wireless connection environmental condition, a numerology configuration of resources of the wireless connection for communicating with the base station including at least one of a requested cyclic prefix or a subcarrier spacing; and
    transmitting, to the base station, a request to communicate with the base station, the request identifying the selected numerology configuration.

2. The method as recited in claim 1, further comprising receiving, from the base station, a resource grant allocating resources of the wireless connection for communicating with the base station, the resource grant allocating the resources of the wireless connection based on the selected numerology configuration.

3. The method as recited in claim 2, wherein the resource grant allocates the resources of the wireless connection in a manner that indicates rejection of at least one aspect of the selected numerology configuration.

4. The method as recited in claim 1, further comprising:
    determining, by the user device and based on the determined wireless connection environmental condition, a requested configuration of a mini-slot for communicating with the base station, the mini-slot comprising less than one slot; and
    transmitting, to the base station, the requested configuration of the mini-slot for communicating with the base station.

5. The method as recited in claim 1, further comprising:
    determining, by the user device and based on an amount of data to transmit to the base station, a requested quantity of uplink orthogonal frequency-division multiplexing (OFDM) symbols per slot to be used for communicating with the base station; and
    transmitting, to the base station, an indication of the requested quantity of uplink OFDM symbols per slot.

6. The method as recited in claim 1, further comprising:
    determining, by the user device, a requested schedule of uplink orthogonal frequency-division multiplexing (OFDM) symbols and downlink OFDM symbols to be used for communicating with the base station; and
    transmitting, to the base station, the requested schedule of uplink OFDM symbols and downlink OFDM symbols.

7. The method as recited in claim 1, wherein
    the requested subcarrier spacing is selected based on the determined one or more of the Doppler effect or the phase noise.

8. The method as recited in claim 1, wherein
    the requested cyclic prefix is based on the determined delay spread of the downlink transmissions received from the base station.

9. The method as recited in claim 1, wherein the transmitting the resource configuration request further includes transmitting a requested schedule for changing elements of the selected numerology configuration.

10. A user device comprising:
    a processor;
    a hardware-based transceiver: and
    a computer-readable storage medium having stored instructions that, responsive to execution by the processor, cause the processor to:
        determine a wireless connection environmental condition related to transmissions received from a base station over a wireless connection;
        select, based on the determined wireless connection environmental condition, a mini-slot configuration for communicating with the base station, the mini-slot configuration identifying a quantity of orthogonal frequency division multiplexing (OFDM) symbols for communicating via at least one mini-slot that is less than a quantity of OFDM symbols for one slot; and
        transmit, to the base station, a request to communicate with the base station via the at least one mini-slot, the request identifying the selected mini-slot configuration.

11. The user device as recited in claim 10, wherein the selected mini-slot configuration includes a requested schedule of OFDM symbols of the at least one mini-slot.

12. The user device as recited in claim 10, wherein the selected mini-slot configuration identifies a timing offset of the at least one mini-slot relative to a boundary of a slot that includes at least a portion of the at least one mini-slot.

13. The user device as recited in claim 12, wherein the timing offset is determined, by the user device, to avoid a conflict with a communication via another wireless connection of the user device.

14. The user device as recited in claim 10, wherein the instructions further cause the processor to:
    receiving, from the base station, a resource grant allocating resources of the wireless connection for communicating with the base station via the at least one mini-slot, the resource grant allocating the resources of the wireless connection based on the selected mini-slot configuration.

15. The user device as recited in claim 10, wherein the user device receives the resource grant in a radio resource control message, a medium access control message, or a downlink control information message.

16. A method performed by a user device to implement a user device-initiated request for wireless resources, the method comprising:
   determining, by the user device, a wireless connection environmental condition related to downlink transmissions from a base station over a wireless connection;
   generating, by the user device and based on the determined wireless connection environmental condition, a resource configuration request including at least two elements related to any one or more of: (a) a numerology configuration, (b) a mini-slot configuration, or (c) a schedule for uplink and downlink orthogonal frequency-division multiplexing (OFDM) symbols;
   transmitting, to the base station, the resource configuration request; and
   receiving, from the base station, a resource grant confirming or rejecting each element of the at least two elements.

17. The method as recited in claim 16, wherein the generating the resource configuration request is further based on an amount of data to be transmitted to the base station.

18. The method as recited in claim 16, wherein the generating the resource configuration request is further based on another schedule of another wireless connection of the user device.

19. The method as recited in claim 16, wherein one of the elements is related to the mini-slot configuration and another of the elements is related to the schedule for uplink and downlink OFDM symbols.

20. A method performed by a user device to implement a user device-initiated request for resource configuration, the method comprising:
   determining, by the user device, a wireless connection environmental condition related to transmissions received from a base station over a wireless connection;
   selecting, by the user device and based on the determined wireless connection environmental condition, a numerology configuration of resources of the wireless connection for communicating with the base station including a requested cyclic prefix or subcarrier spacing;
   transmitting, to the base station, a request to communicate with the base station, the request identifying the selected numerology configuration; and
   receiving, from the base station, a resource grant allocating resources of the wireless connection for communicating with the base station, the resource grant allocating a portion of the resources of the wireless connection in a manner that indicates confirmation of at least one aspect of the selected numerology configuration.

* * * * *